3,671,088
FLEXIBLE WHEEL
William P. Woolley, 3921 Cambridge St.,
Jackson, Miss. 39216
Filed July 22, 1970, Ser. No. 57,287
Int. Cl. B60b 9/02
U.S. Cl. 305—7      3 Claims

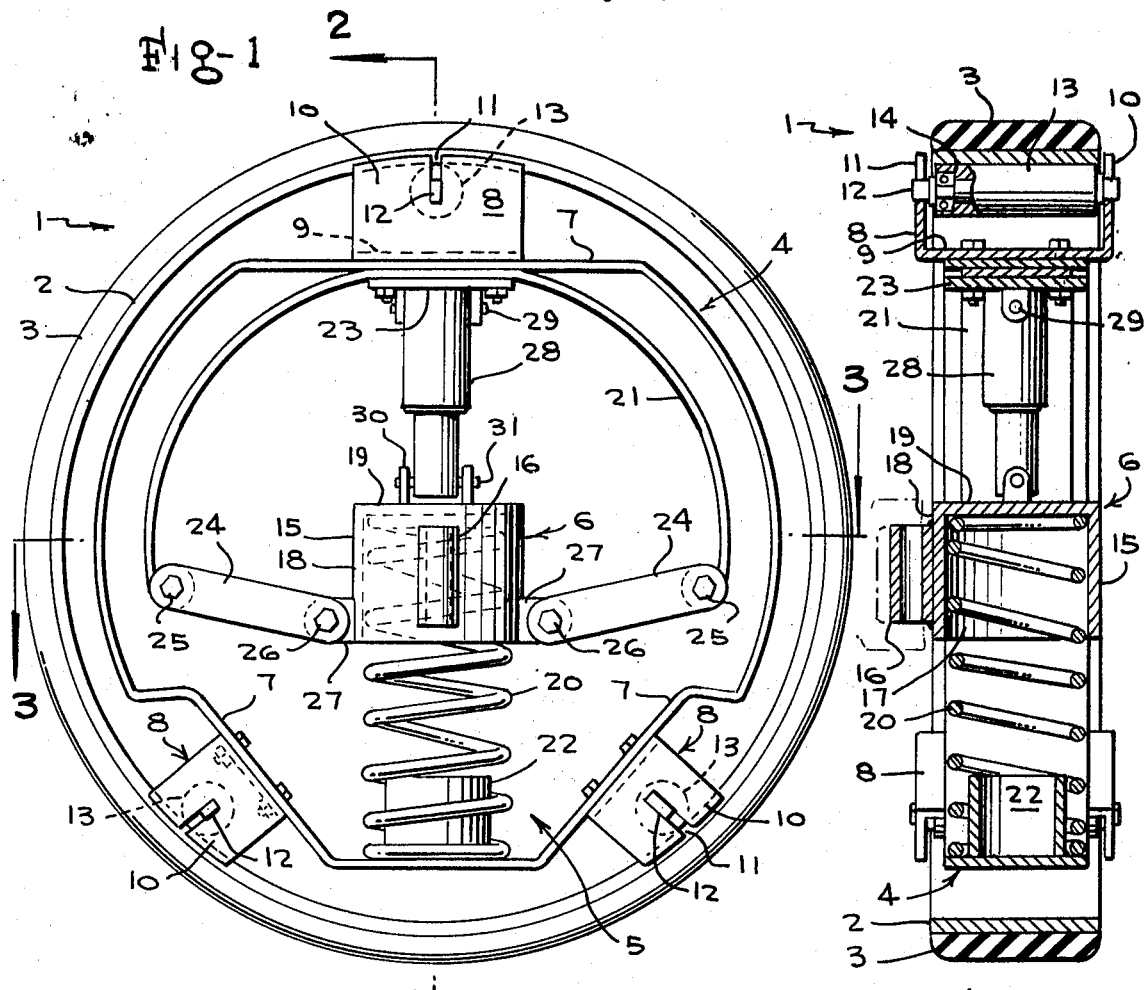
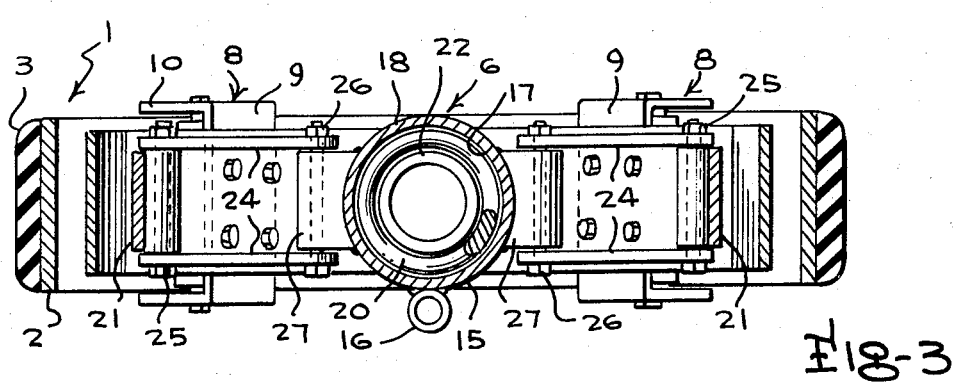

ABSTRACT OF THE DISCLOSURE

An internally sprung wheel wherein the wheel rim is rotatably supported upon rollers carried at circumferentially spaced points by a frame, and the frame is resiliently supported from a center member for attachment to a vehicle frame. The resilient mounting includes a coil spring from the center member to the base of the frame, and a leaf spring attached at its center to the frame top and having its free ends connected to links pivotally carried by the center member. A shock-absorber may be mounted between the center member and the frame top if desired.

BACKGROUND OF THE INVENTION

This invention relates to vehicle wheels, and more particularly to vehicle wheels incorporaiting means to absorb road shocks.

Traditionally, vehicles have been supported upon relatively rigid wheels rotatably mounted upon axles carried by the vehicle, and springs and other shock-absorbing devices are mounted between the axle and the vehicle frame. Thus, the entire wheel is subjected to rapid vertical movement when travelling over uneven road surfaces, and the wheel weight, which is sometimes considerable, is applied to the vertical thrust put upon the vehicle frame and whatever body may be carried upon it.

Some effort has been made to provide an internally sprung wheel, wherein the wheel rim and its tire are movable relative to the point of attachment of the wheel to the vehicle. A number of wheels of this type have been proposed, and those suggested have fallen into two categories. The first type has the wheel rim supported from a central hub by resilient means, to allow the rim to move in a vertical plane relative to the hub. The rim and hub, however, rotate toegther. In the second form, the hub, or central portion, of the wheel is fixed to the vehicle to be stationary relative to the vehicle, while the rim is free to rotate relative to the hub. In this form, the resilient means is positioned between the stationary central portion and the rim.

While good springing and shock-absorbing qualities can be obtained in wheels of this kind, it has been difficult to obtain good shock-absorbing results and maintain sufficient lateral stability within the wheel.

SUMMARY OF THE INVENTION

The general object of the present invention is to provide an internally sprung vehicle wheel of the type having a central portion for fixed attachment to a vehicle and a rim rotatable relative thereto, which has improved springing, shock-abshorbing and lateral stability characteristics.

A more specific object is to provide a wheel of the type which embodies both a coil spring and a leaf spring mounting between the fixed central portion and the rotatable rim to obtain the superior cushioning effects of the coil spring with the stability of the leaf spring.

Another object is the provision of an internally sprung wheel which is capable of incorporating a shock-absorber of standard construction to further dampen shock and increase the stability of the wheel.

A further object of the invention is to provide such a wheel wherein there is a non-rotatable frame to support the rotatable rim, and the springing and shock-absorbing members are located between the central portion to be fixedly connected to the vehicle and the non-rotatable frame.

Other objects of the invention will become apparent from the following description of one practical embodiment thereof, when taken in conjunction with the drawings which accompany, and form, this specification.

BRIEF DESCRIPTION OF THE DRAWINGS

FIG. 1 is a side elevation of an internally sprung wheel incorporating the principles of the present invention;

FIG. 2 is a vertical sectional setcion through the wheel, taken on the line 2—2 of FIG. 1; and FIG. 3 is a horizontal section through the wheel, taken on the line 3—3 of FIG. 1.

DESCRIPTIION OF THE PREFERRED EMBODDIMENT

The wheel of the present invention can be used on any vehicle, or in any place where a wheeled support is desired. Therefore, no particular type of wheel has been illustrated, and the wheel shown in the drawings, insofar as the rim and tire are concerned, are merely representative.

Referring now to the drawings, the wheel 1 consists of a rim 2, of any suitable type, on which a tire 3 may be mounted if desired. It is important only that the wheel have a circular rim. The rim is rotatably supported upon a frame 4 which is resiliently mounted by means of spring structure 5 upon a central member 6 designed for fixed connection to the vehicle, or other body, which the wheel is to support.

Frame 4 is shown as an open member of substantially the width of the rim, and generally following the inner contour of the rim. At three, or more, places around the rim, the rim is flattened, as at 7, to provide seats for U-shaped brackets 8, the brackets having bases 9 for attachment to the seats 7 and spaced, parallel, upstanding arms 10 straddling the rim 2. The rim is free to rotate between the bracket arms, but the arms will limit the relative lateral movement permitted between the frame and rim. The arms 10 of each bracket are notched inwardly from their ends to provide slots 11 to receive shafts 12 rotatably supporting rollers 13. Suitable bearings 14 are used to assure free rotation of the rollers on their respective shafts. The rollers are so positioned that they are in rolling contact with the inner surface of the rim, and the rim will be symmetrically supported upon the rollers. Except for the rotation of the rim on the frame, there is no other relative movement between these members.

Central member 6 is composed of a spring-supporting member 15 and a vehicle attaching member 16. The attaching member may take the form of a bracket, as shown, or any other suitable element. The spring-supporting member is an inverted cup 17, fixed to, or a part of, the attaching bracket, and includes a cylindrical wall 18 and a closed top 19. The axis of the cup is vertical and on the vertical diameter of the rim and frame.

The spring structure 5 is composed of two elements, a coil spring 20 and a leaf spring 21. Coil spring 20 has its upper end seated in the inverted cup of the central member 6 and its lower end encircles a vertical boss 22 at the bottom of frame 4 and seats upon the frame. Boss 22 and the cylindrical wall 18 of the cup hold the spring against lateral movement. The spring resiliently bears upon the cup closed top 19 and the frame bottom. This would tend to urge the frame and rim downwardly relative to the central member 6. Leaf spring 21 is joined at its center to the upper center of frame 4, as at 23, and has its ends connected to links 24 by pivot pins 25.

The links, in turn, are connected by pins 26 to ears 27 projecting from opposite sides of cylindrical wall 18 of the cup 17 of the central member. This arrangement provides for equal and uniform flexing of the opposed arms of spring 22 to insure vertical movement of the rim relative to the central member when the wheel contacts uneven surfaces. The leaf spring is biased to tend to urge the rim and frame upwardly relative to the central member and to balance, or offset, the bias of coil spring 20.

Springs 20 and 21 may be biased to achieve any desired purpose. For example, they may be biased simply to pre-load them to offset one another, so that the attaching means 16 is at the rim center when the wheel is unloaded. More practically, the springs can be pre-loaded to have the rim center at the point of attachment to the vehicle when the wheel is mounted and under vehicle load, for optimum results from both springs in operation. While a coil spring is prone to lateral sway during operation, it provides more responsive cushioning effect than a leaf spring. The leaf spring, on the other hand, resists lateral movement and will hold the coil spring in the intended vertical plane of operation. By proper pre-loading of the two, a well cushioned operation with good lateral stability can be achieved.

For added stability and further cushioning of the uneven surface shocks, a shock-absorber 28 is shown mounted within frame 4, connected by pin 29 to the upper center of the frame and to an ear 30 on the top 19 of the center member cup 17 by means of pin 31. If this stability is not desired, the shock-absorber may not be used.

The present wheel provides a free rolling, internally sprung wheel which will absorb surface shocks within itself and not transmit them to the vehicle to which it is attached. The frame and rim are free to move vertically when moving over rough surfaces without interfering in any way with the free rolling qualities of the wheel. The soft, cushioning action of a coil spring is utilized, while lateral stability of the assembly is maintained by the leaf spring. Attachment of the leaf spring to the center member by pivoted links on opposite sides of the wheel vertical centerline assures true vertical movement of the rim when uneven surfaces are encountered. Increased control of spring action, and added stability can be gained by the use of a shock-absorber, such as the one shown at 28, but this is not necessarily a part of the wheel structure.

While one practical embodiment of the invention has been disclosed, it will be understood that the details of construction shown and described are hereby by way of illustration and the invention may take other forms within the scope of the appended claims.

I claim:

1. A spring wheel comprising, an open frame, rollers carried by the frame at arcuately spaced points exteriorly of the frame, a rim about the frame rotatably supported by the rollers, a mounting member to connect to a vehicle, a coil spring beneath the mounting member and vertically interposed between the mounting member and the frame to resiliently support the mounting member upon the coil spring, and a leaf spring attached at its center to the frame directly above the mounting member and having its ends equally spaced on opposite sides of the mounting member with links pivotally connected to the leaf spring ends and opposite sides of the mounting member.

2. A spring wheel as claimed in claim 1 wherein, there is a shock absorber between the frame and the mounting member.

3. A spring wheel as claimed in claim 2 wherein, the shock absorber is arranged vertically in alignment with the coil spring and connected to the frame in the region of connection of the leaf spring to the frame and to the mounting member on the opposite side from the coil spring.

References Cited

UNITED STATES PATENTS

| 1,167,307 | 1/1916 | McCandless | 305—7 |
| 1,094,259 | 4/1914 | Scognamillo | 301—136 |
| 1,566,467 | 12/1925 | DeCastroéiznaga | 305—7 |
| 1,337,068 | 4/1920 | Harden | 152—38 |

ARTHUR L. LA POINT, Primary Examiner

D. W. KEEN, Assistant Examiner

U.S. Cl. X.R.

152—29; 301—136